(12) United States Patent
Saito

(10) Patent No.: US 12,541,103 B2
(45) Date of Patent: Feb. 3, 2026

(54) HEAD-UP DISPLAY

(71) Applicant: NIPPON SEIKI CO., LTD., Niigata (JP)

(72) Inventor: Wataru Saito, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 308 days.

(21) Appl. No.: 18/548,778

(22) PCT Filed: Mar. 10, 2022

(86) PCT No.: PCT/JP2022/010478
§ 371 (c)(1),
(2) Date: Sep. 1, 2023

(87) PCT Pub. No.: WO2022/191270
PCT Pub. Date: Sep. 15, 2022

(65) Prior Publication Data
US 2024/0151967 A1    May 9, 2024

(30) Foreign Application Priority Data

Mar. 12, 2021 (JP) .................................. 2021-040347

(51) Int. Cl.
*G02B 27/01* (2006.01)
*B60K 35/22* (2024.01)
(Continued)

(52) U.S. Cl.
CPC .......... *G02B 27/0101* (2013.01); *B60K 35/22* (2024.01); *B60K 35/231* (2024.01);
(Continued)

(58) Field of Classification Search
CPC .... G02B 27/0101; B60K 35/50; B60K 35/22; B60K 35/231
See application file for complete search history.

(56) References Cited

U.S. PATENT DOCUMENTS

| 11,099,383 B2* | 8/2021 | Furusawa .......... G02B 27/0101 |
| 2019/0293932 A1 | 9/2019 | Tsuchiya et al. |
| 2021/0271078 A1* | 9/2021 | Watanabe .............. B60K 35/22 |

FOREIGN PATENT DOCUMENTS

| JP | 2009151249 A | 7/2009 |
| JP | 2010175574 A | 8/2010 |
| (Continued) | | |

OTHER PUBLICATIONS

International Search Report issued in corresponding International Application No. PCT/JP2022/010478, dated May 24, 2022, w/ English Translation (4 pages).

*Primary Examiner* — Lucy P Chien
(74) *Attorney, Agent, or Firm* — RIMON P.C.

(57) ABSTRACT

To provide a head-up display that can provide light-shielding portions at a plurality of locations while controlling costs. Provided is a head-up display comprising: a display device that displays images; a plane mirror that reflects display light from the display device; a concave mirror that reflects display light via the plane mirror; a cover glass that allows display light to pass through the concave mirror; and a blind cover formed as an integral member, a virtual image being displayed by using the display light projected on an object from the display device via a prescribed optical path through the plane mirror, the concave mirror, and the cover glass, wherein the blind cover is provided with a first light-shielding portion that blocks the display light that deviates from the prescribed light path from the display device to the plane mirror, a second light-shielding portion that suppresses external light passing through the cover glass from entering the inside, and an attachment portion that attaches the plane mirror to the blind cover.

7 Claims, 15 Drawing Sheets

(51) Int. Cl.
*B60K 35/23* (2024.01)
*B60K 35/231* (2024.01)
*B60K 35/50* (2024.01)

(52) U.S. Cl.
CPC .............. *B60K 35/50* (2024.01); *B60K 35/23* (2024.01); *B60K 2360/23* (2024.01); *B60K 2360/31* (2024.01)

(56) References Cited

FOREIGN PATENT DOCUMENTS

| JP | 2018-192962 A | 12/2018 |
| WO | 2016/204021 A1 | 12/2016 |
| WO | 2018/079307 A1 | 5/2018 |
| WO | 2020/153474 A1 | 7/2020 |

* cited by examiner

HEAD-UP DISPLAY

CROSS REFERENCE TO RELATED APPLICATIONS

This application is the U.S. National Phase under 35 U.S.C. § 371 of International Application No. PCT/JP2022/010478, filed on Mar. 10, 2022, which claims the benefit of Japanese Application No. 2021-040347, filed on Mar. 12, 2021, and the entire contents of each are hereby incorporated by reference.

TECHNICAL FIELD

The present disclosure relates to a head-up display.

BACKGROUND ART

There are known head-up displays that project display light from a liquid crystal display to an object such as a windshield of a vehicle through a cover glass to display a virtual image in front of the object. In some cases, the head-up display includes a light-shielding portion to prevent the display light from the liquid crystal display from reaching the cover glass via an optical path other than a predetermined optical path in order to improve the display quality. Patent Document 1 discloses, as such a light-shielding portion, a light-shielding portion provided near a liquid crystal display element. Furthermore, a light-shielding portion is provided to prevent the phenomenon (washout) in which outside light such as sunlight enters the liquid crystal display and makes it difficult to view the virtual image so that the display quality may be improved. Patent Document 2 discloses a head-up display having a light-shielding portion (light-shielding wall) formed near a window portion to prevent washout.

PRIOR ART DOCUMENT

Patent Document

Patent Document 1: Japanese Laid-open Patent Publication No. 2010-175574
Patent Document 2: Japanese Laid-open Patent Publication No. 2009-151249

SUMMARY OF THE INVENTION

Problems to be Solved by the Invention

The member forming the above-described light-shielding portion needs to be subjected to processing such as printing (painting) or surface texturing in order to reduce light reflection. Therefore, when a plurality of light-shielding portions is provided, the above-described processing is needed for each of the members, which results in higher costs.

The present disclosure has an object to provide a head-up display that may include light-shielding portions in a plurality of locations while suppressing costs.

Solution to Problem

According to one aspect, a head-up display is provided, which includes a display device that displays an image, a plane mirror that reflects display light from the display device, a concave mirror that reflects the display light having passed the plane mirror, a cover glass that transmits the display light having passed the concave mirror, and a blind cover formed as an integral member, wherein the head-up display presents a virtual image with the display light projected onto an object through a predetermined optical path from the display device to the plane mirror, the concave mirror, and the cover glass, and the blind cover includes a first light-shielding portion that shields the display light deviating from the predetermined optical path between the display device and the plane mirror, a second light-shielding portion that prevents outside light having passed through the cover glass from entering inside, and an attachment portion that attaches the plane mirror to the blind cover.

Effect of the Invention

According to the present disclosure, it is possible to provide a head-up display that may include light-shielding portions in a plurality of locations while suppressing costs.

MODE FOR CARRYING OUT THE INVENTION

An embodiment will be described below in detail with reference to the accompanying drawings.

Figure 1:
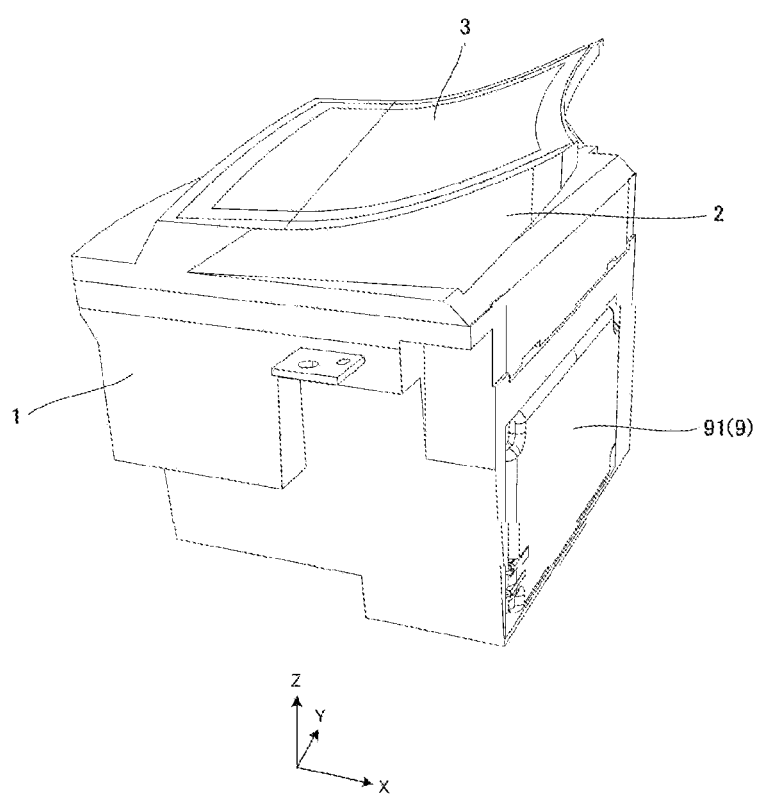
FIG. 1 is a perspective view illustrating an external appearance of a head-up display according to the present embodiment.
Figure 2:
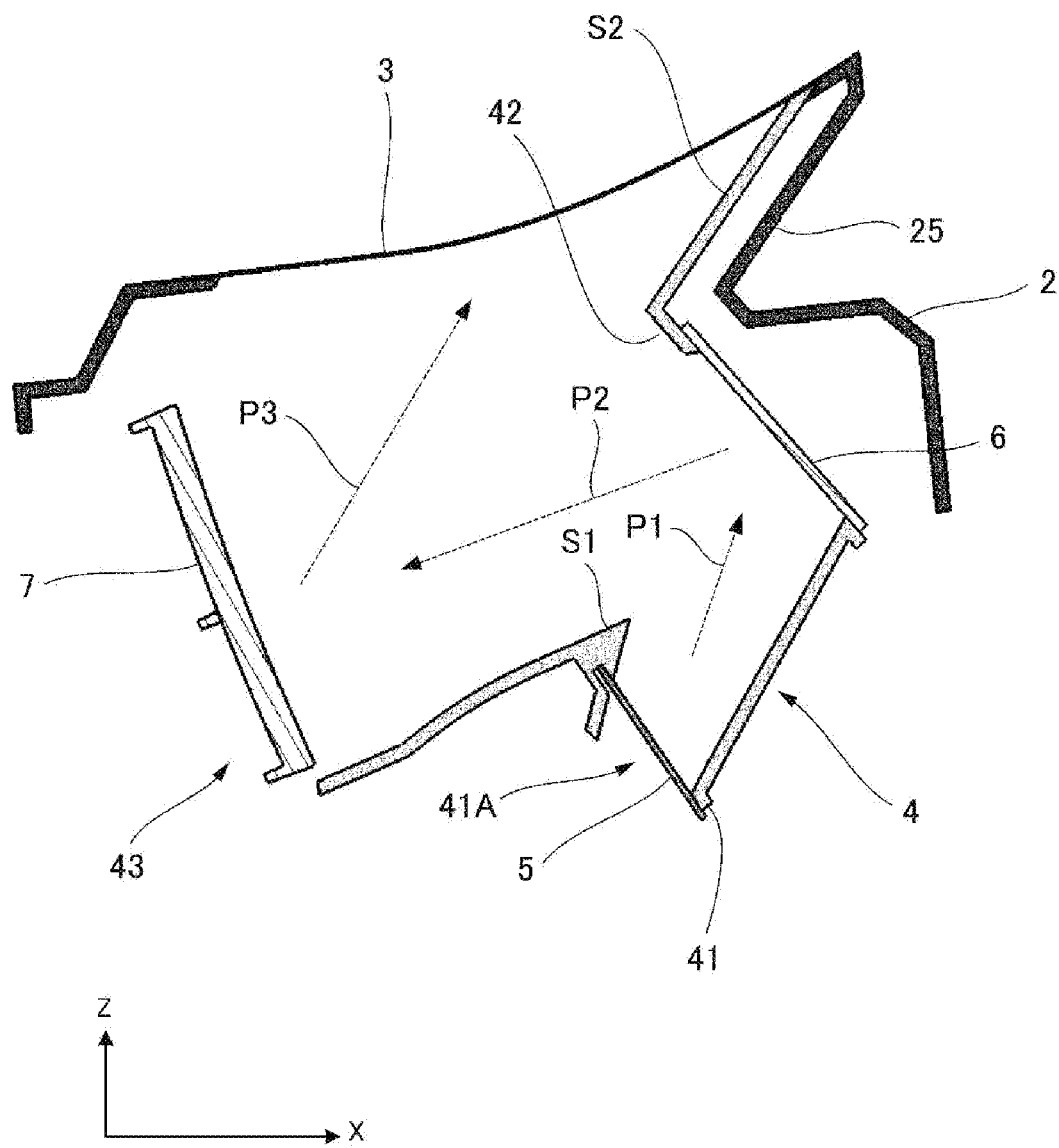
FIG. 2 is a cross-sectional view illustrating a configuration of part of the head-up display.
Figure 3A:
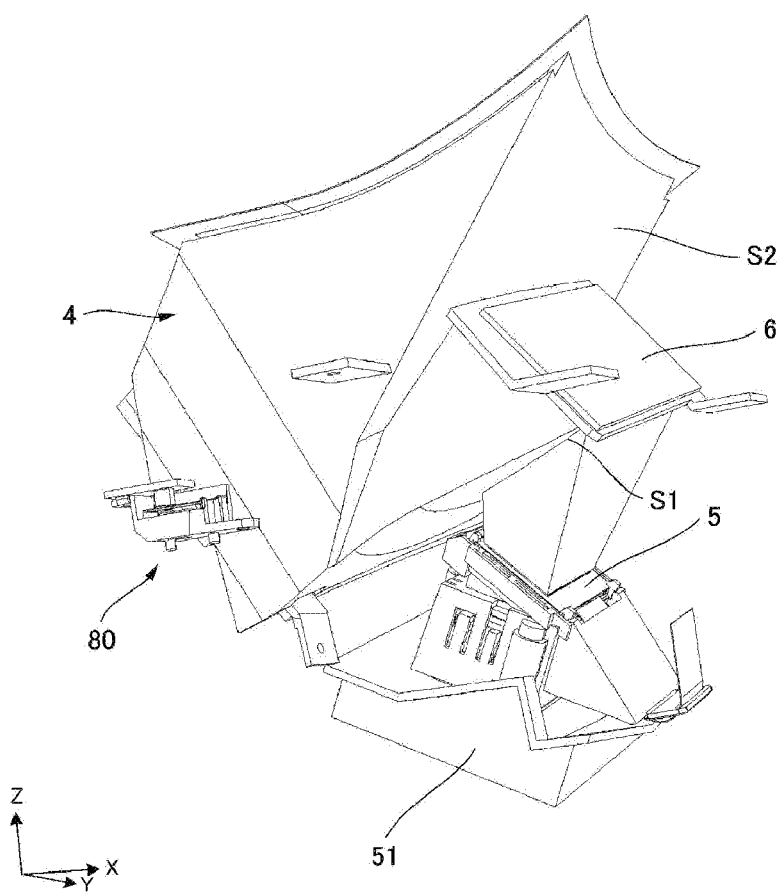
FIG. 3A is a perspective view illustrating a configuration of part of the head-up display.
Figure 3B:
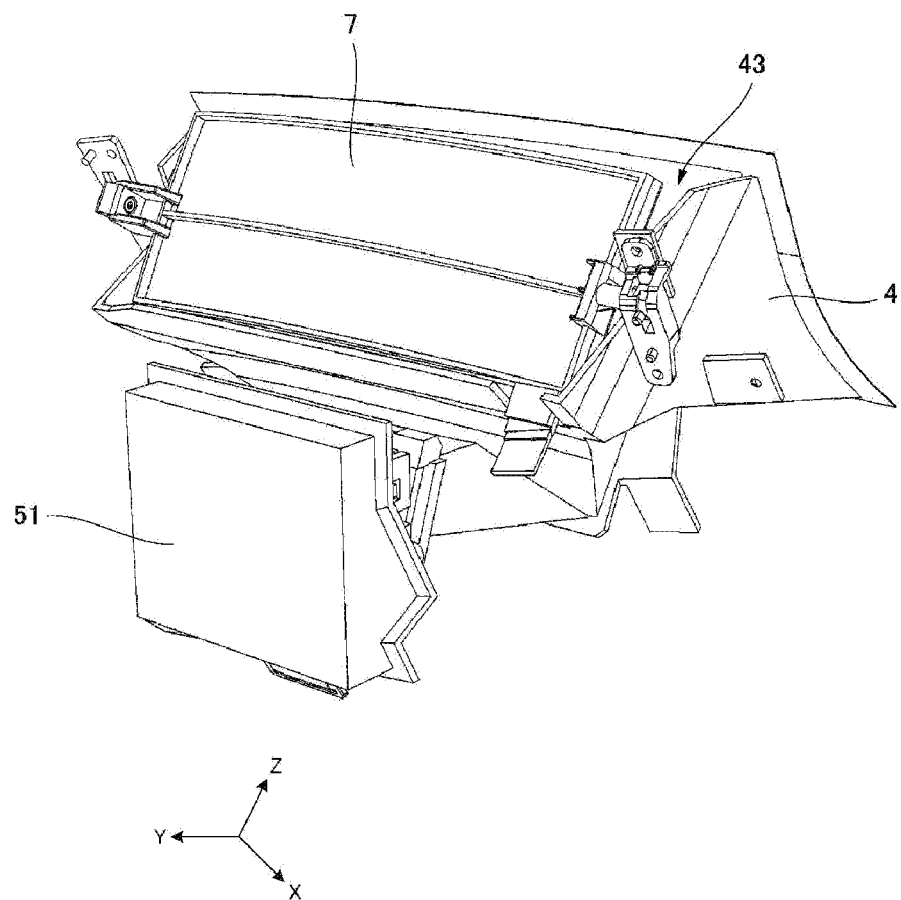
FIG. 3B is a perspective view illustrating a configuration of part of the head-up display.

FIG. 1 is a perspective view illustrating an external appearance of a head-up display according to the present embodiment, FIG. 2 is a cross-sectional view illustrating a configuration of part of the head-up display, and FIGS. 3A and 3B are perspective views illustrating a configuration of part of the head-up display. Further, FIGS. 1 to 7 illustrate the common XYZ coordinates.

As illustrated in FIG. 1, the head-up display according to the present embodiment includes a lower case 1 and an upper case 2 attached to the lower case 1. The lower case 1 and the upper case 2 are made of opaque resin such as PC/PET resin, which is an alloy of polycarbonate (PC) resin and polyethylene terephthalate (PET) resin. The upper case 2 is provided with an opening that functions as an emission port for display light. The opening is covered with a light-transmitting cover glass 3. The cover glass 3 is a dustproof cover made of acrylic resin, polycarbonate resin, or the like, having high light transmittance and is bonded to the upper case 2. Furthermore, the lower case 1 has a circuit mounting portion 9 attached thereto, which includes a main circuit board (not illustrated) and a metallic insulator case 91 housing the main circuit board.

As illustrated in FIGS. 2 to 3B, inside the lower case 1 and the upper case 2, there are a blind cover 4, a liquid crystal display 5 and an image generation unit 51 supported by the blind cover 4, a plane mirror (a first mirror) 6 supported by the blind cover 4, and a concave mirror (a second mirror) 7.

In the head-up display according to the present embodiment, the display light from the liquid crystal display 5 is sequentially reflected by the plane mirror 6 and the concave mirror 7 along predetermined optical paths P1, P2, and P3 (FIG. 2) and is emitted through the cover glass 3. The display light emitted through the cover glass 3 is projected onto an object such as a windshield of a vehicle so that a virtual image is displayed in front of the object.

The blind cover 4 is configured as an opaque one-piece plastic member such as PC/PET resin, and the surface of the blind cover 4 is subjected to processing such as black printing (painting), surface texturing, or attachment of a low-reflective sheet to reduce light reflection. It is preferable to use, as the low-reflective sheet, for example, a sheet on which a foam resin layer, such as a black and impermeable urethane foam resin, and an adhesive layer are laminated. The sheet including the foam resin layer as the low-reflective sheet has low-reflective characteristics due to diffuse reflection of light by a foam structure including microscopic voids and also has characteristics such that the heat generated by sunlight exposure is unlikely to be transferred to the blind cover 4 because of high heat-insulating properties of the foam structure. As described below, the blind cover 4 functions as a light-shielding portion in a plurality of sites. Specifically, a single member, the blind cover 4, forms the plurality of light-shielding portions, and therefore the above-described process may be done in a single step. Furthermore, a reduction in the number of members may achieve a reduction in the burden of an assembling work.

Figure 4A:
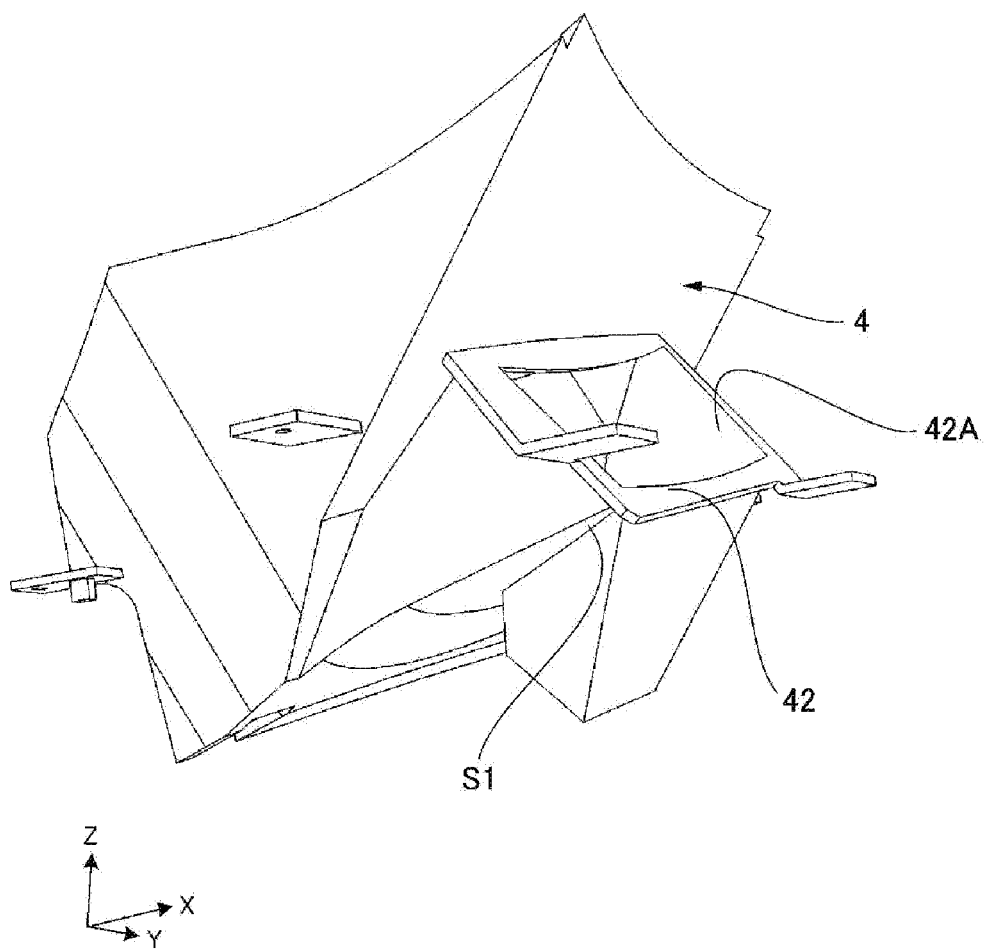
FIG. 4A is a perspective view illustrating a blind cover.
Figure 4B:
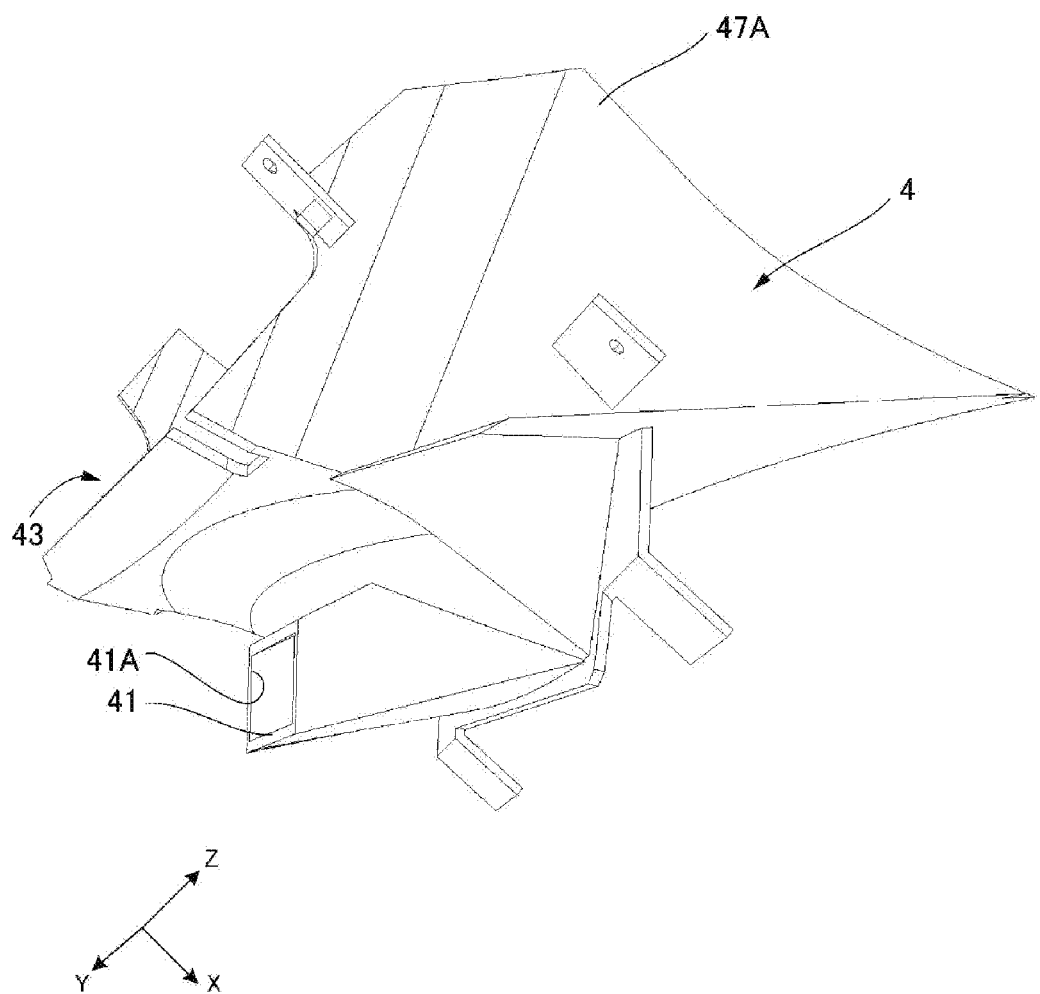
FIG. 4B is a perspective view illustrating the blind cover.
Figure 4C:
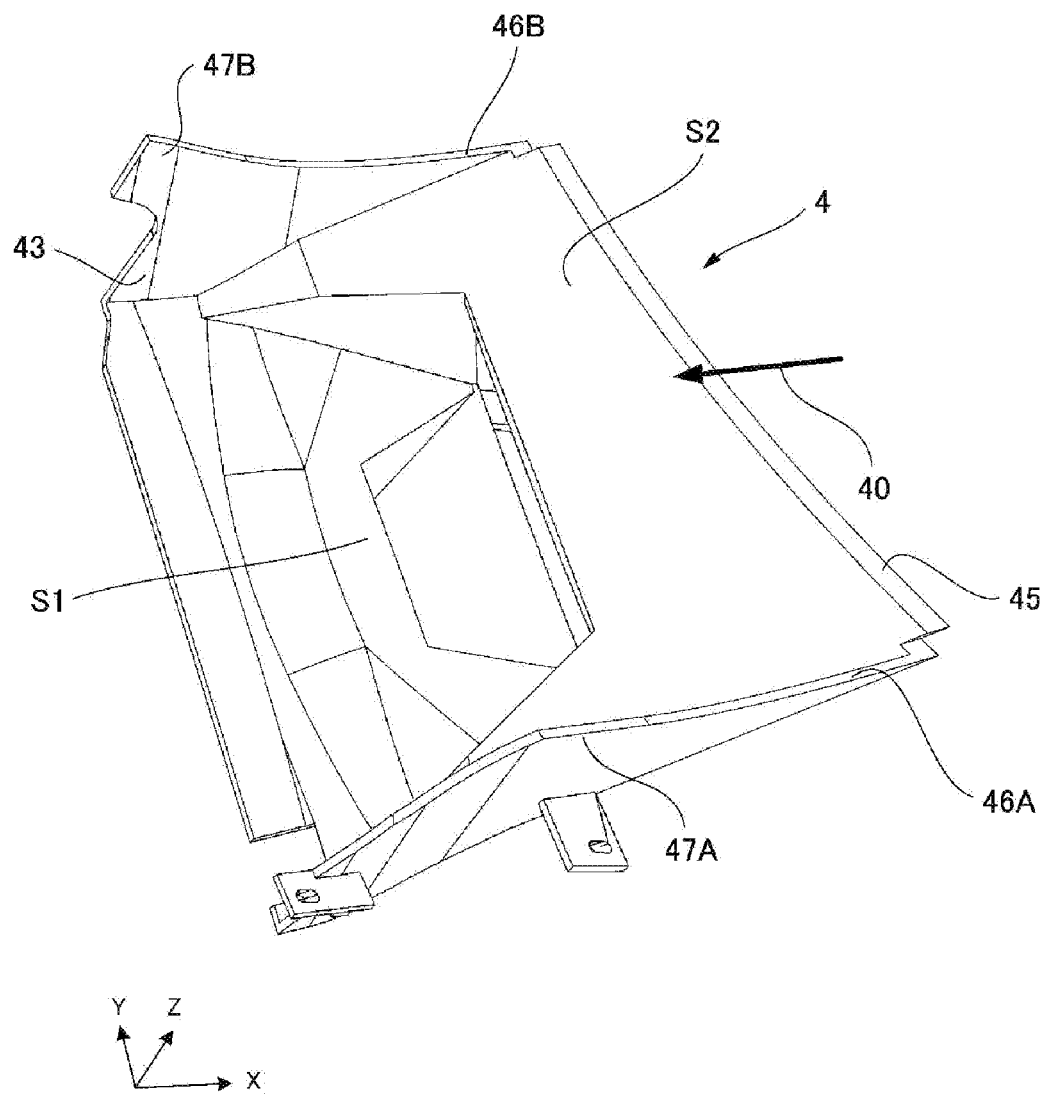
FIG. 4C is a perspective view illustrating the blind cover.
Figure 4D:
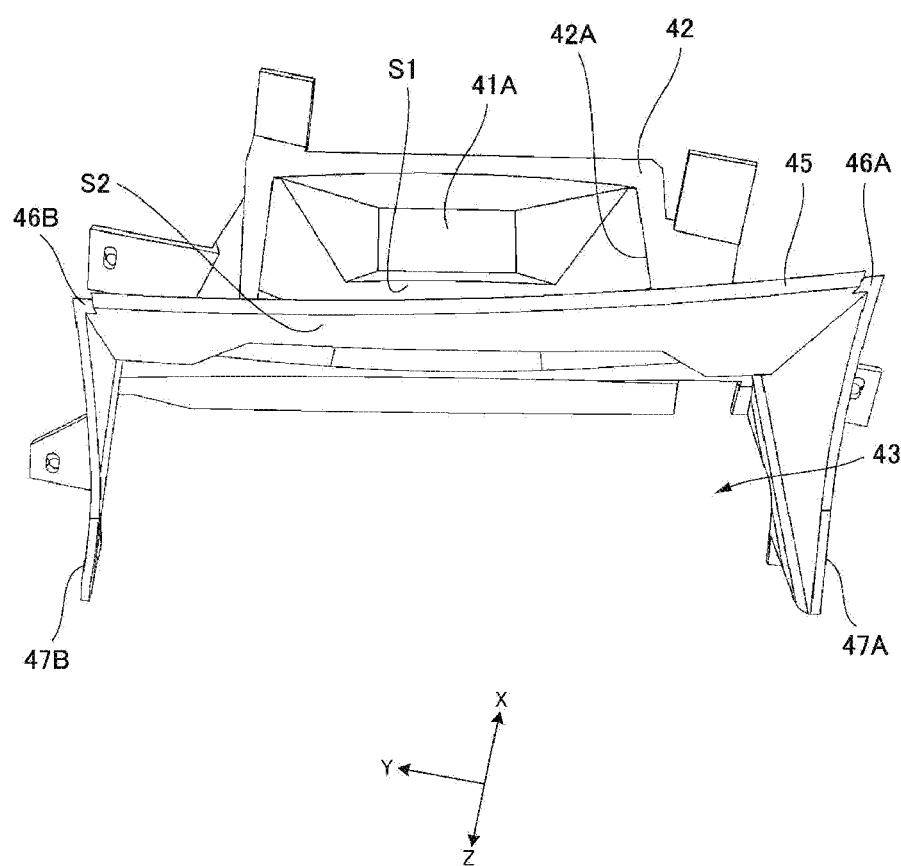
FIG. 4D is a perspective view illustrating the blind cover.
Figure 4E:
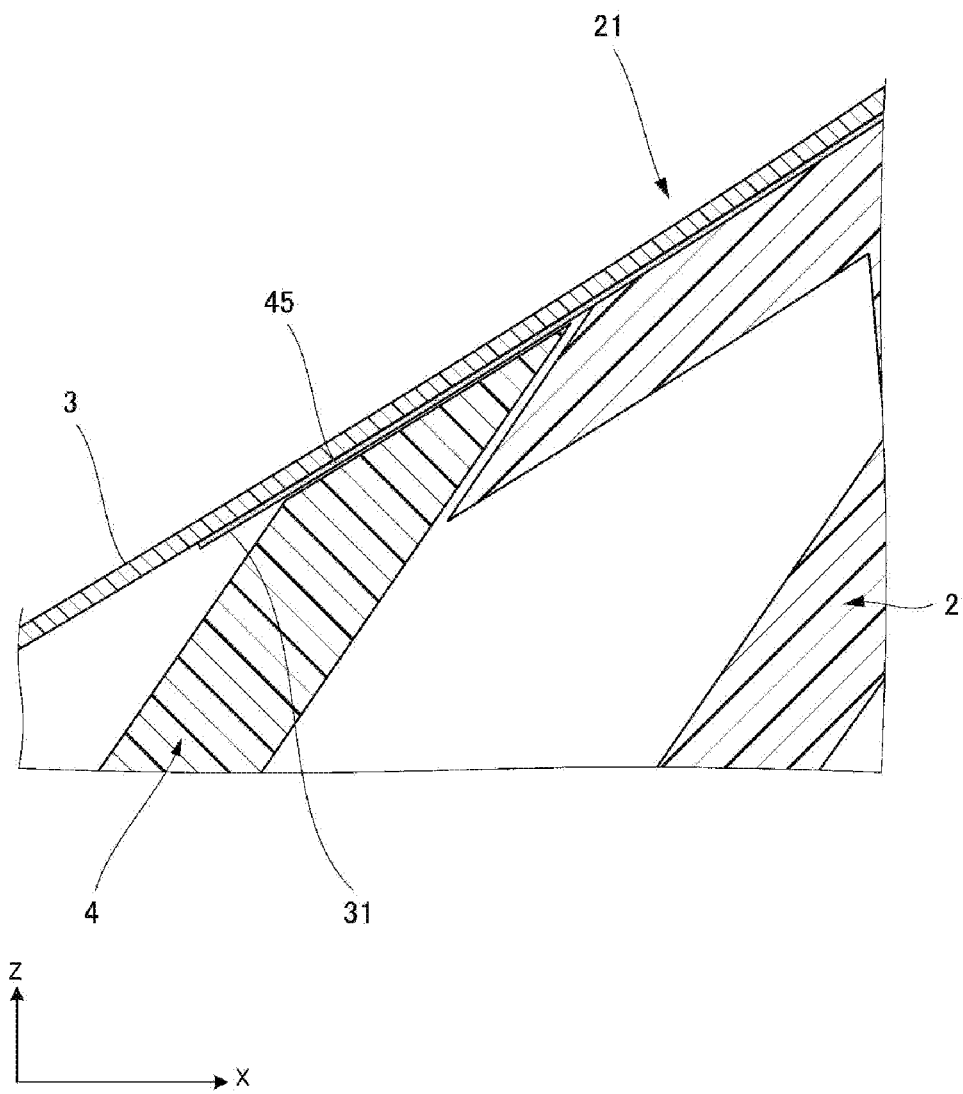
FIG. 4E is a cross-sectional view illustrating the vicinity of a bonding surface of an upper case.
Figure 5A:
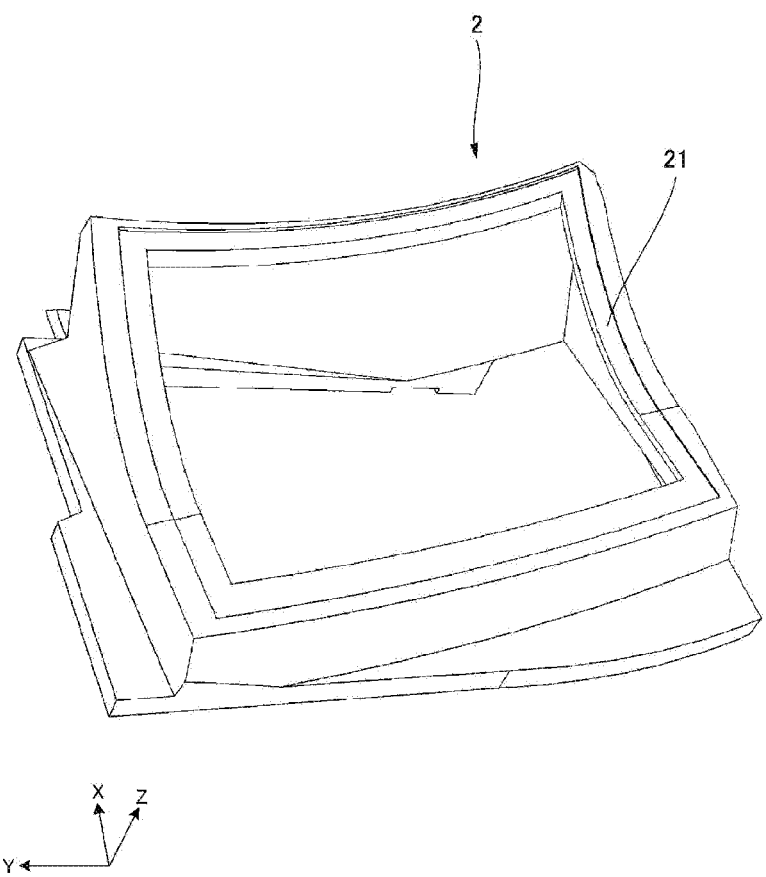
FIG. 5A is a perspective view illustrating the upper case.
Figure 5B:
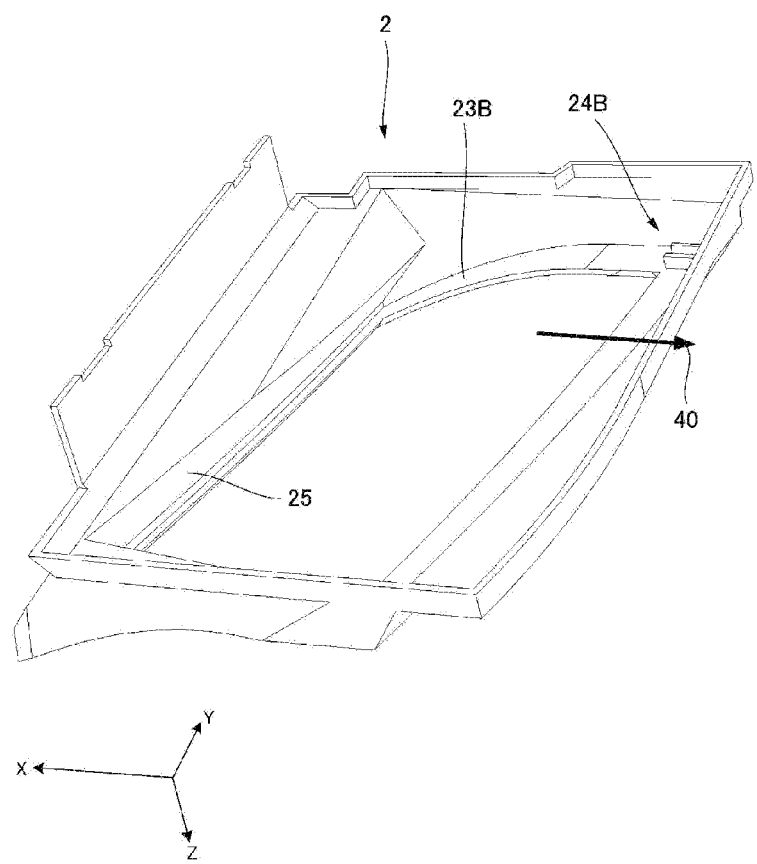
FIG. 5B is a perspective view illustrating the upper case.
Figure 5C:
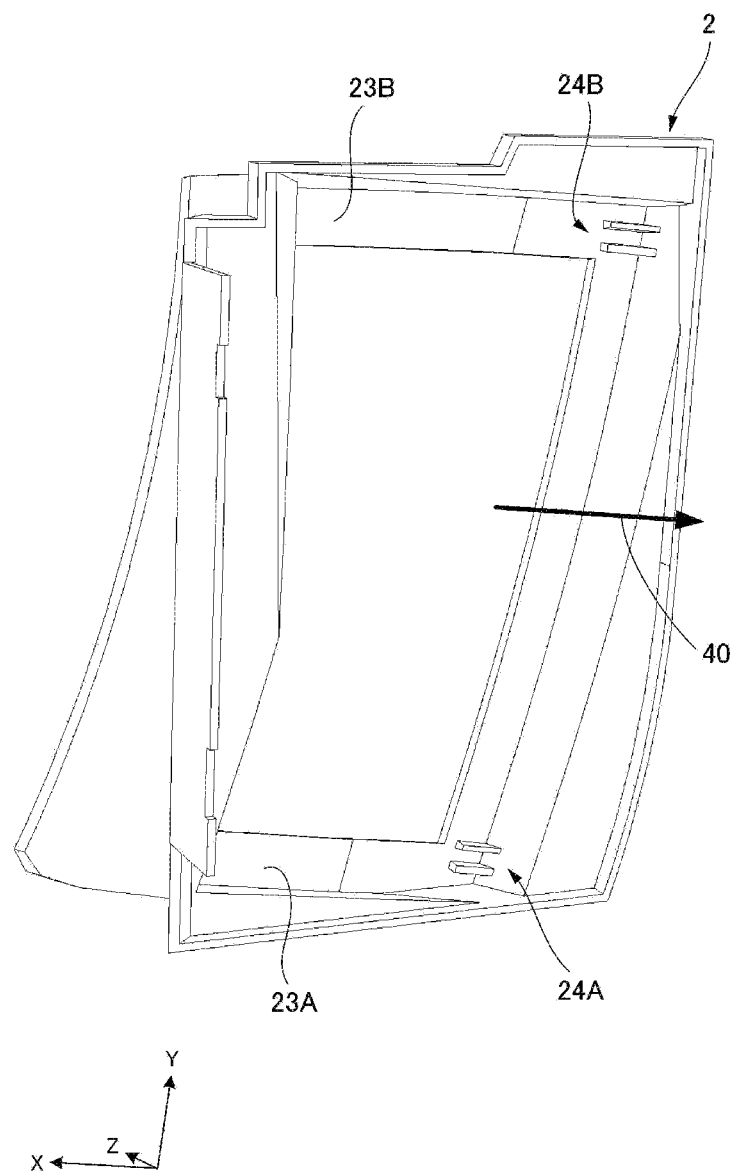
FIG. 5C is a perspective view illustrating the upper case.
Figure 5D:
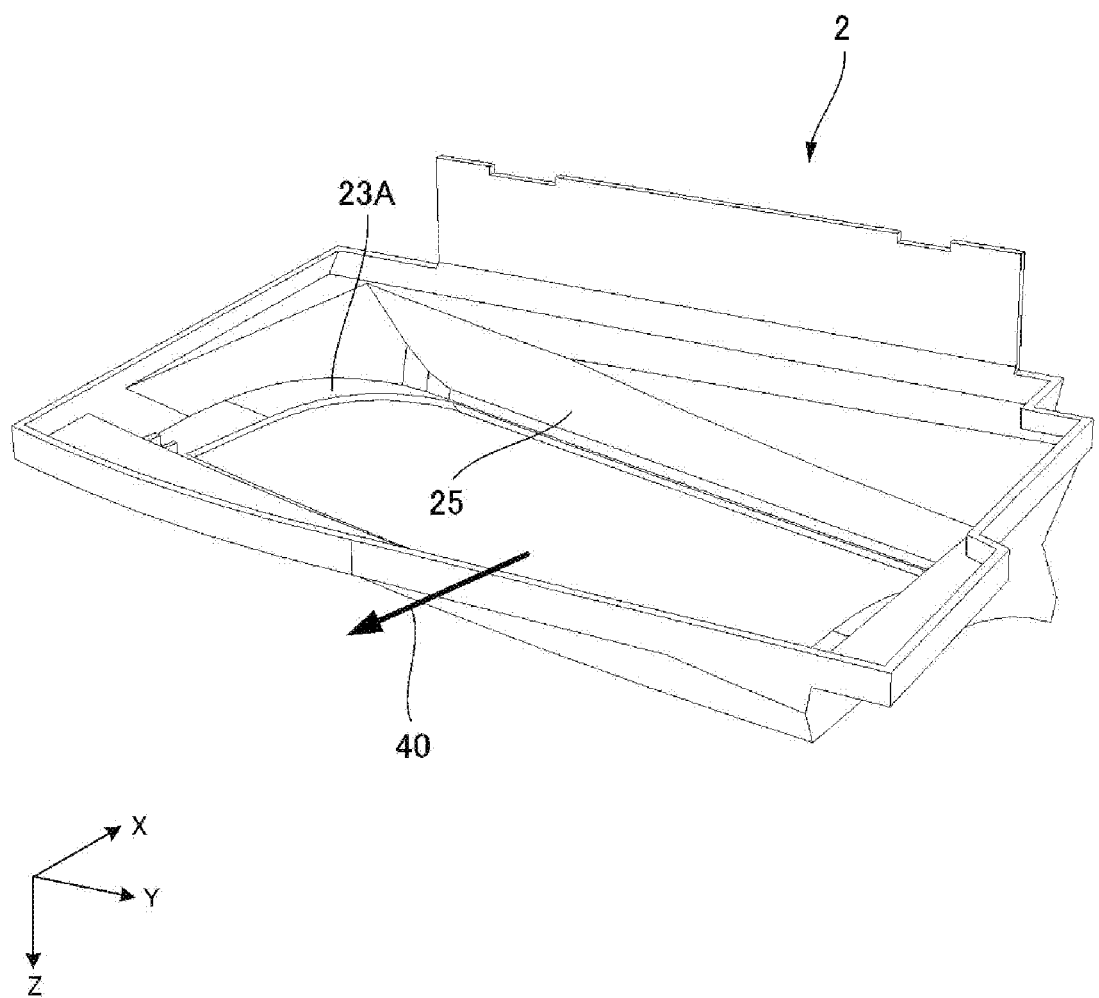
FIG. 5D is a perspective view illustrating the upper case.
Figure 6:
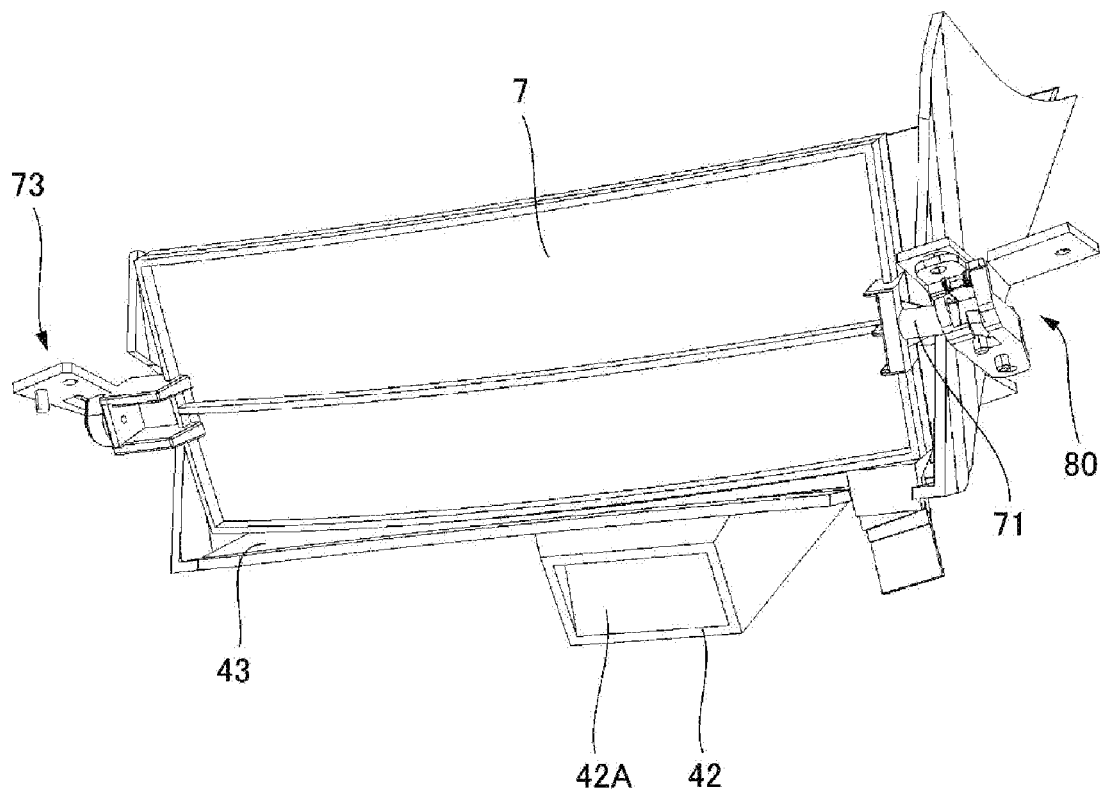
FIG. 6 is a perspective view illustrating a support mechanism of a concave mirror.
Figure 6:
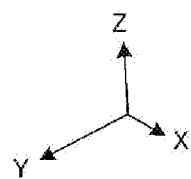
Figure 7:
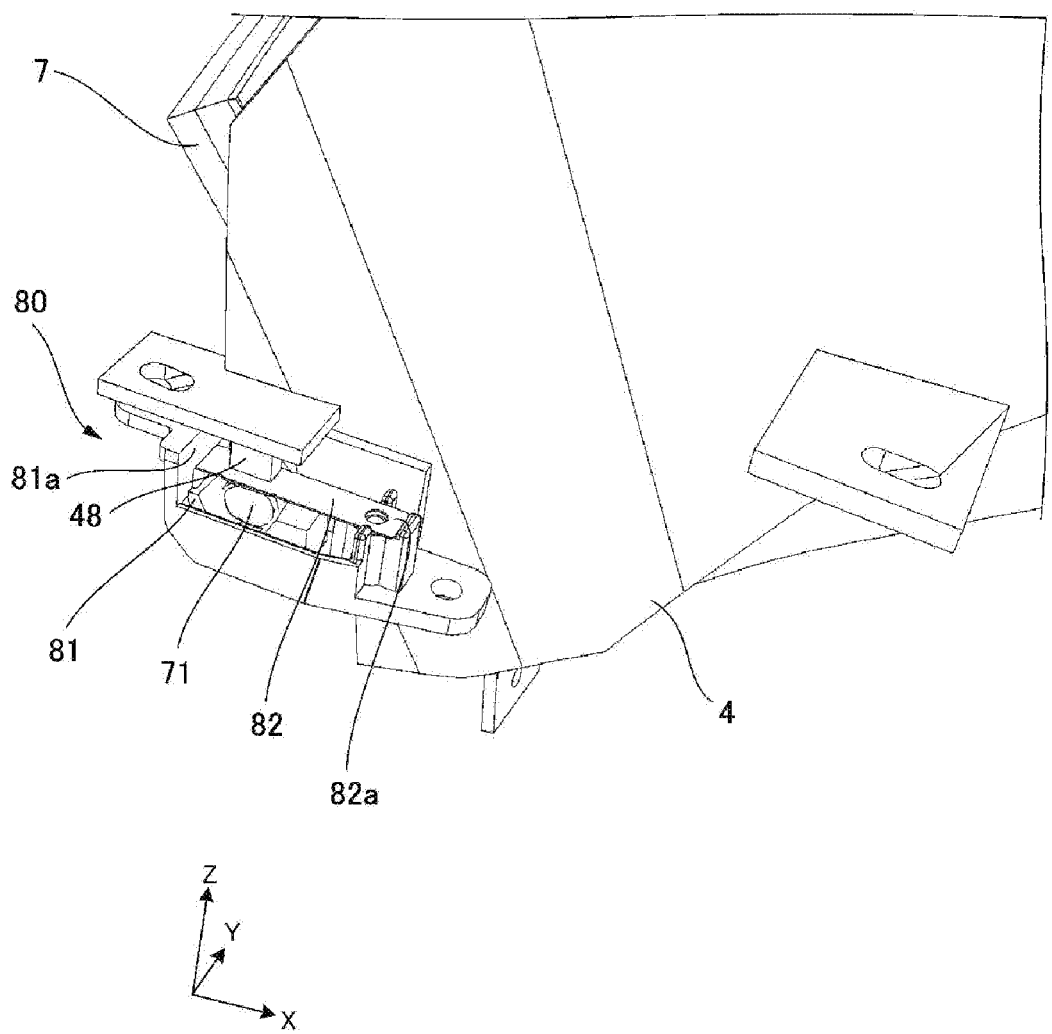
FIG. 7 is an enlarged perspective view illustrating the support mechanism of the concave mirror.

FIGS. 4A to 4D are perspective views illustrating the blind cover, FIG. 4E is a cross-sectional view illustrating the vicinity of a bonding surface of the upper case, FIGS. 5A to 5D are perspective views illustrating the upper case, FIG. 6 is a perspective view illustrating an attachment portion of the concave mirror, and FIG. 7 is a perspective view illustrating an attachment mechanism of the concave mirror.

As illustrated in FIGS. 4A to 4D, the blind cover 4 is provided with an attachment portion 41 (FIG. 4B) formed with an opening 41A corresponding to the display screen of the liquid crystal display 5. The liquid crystal display 5 is attached to the attachment portion 41 with its display screen facing the opening 41A. As the liquid crystal display 5 is attached to the blind cover 4 via the attachment portion 41, there is no need to provide a holding portion that holds the liquid crystal display 5 in another member, such as the image generation unit 51.

Furthermore, the blind cover 4 is provided with an attachment portion 42 to attach the plane mirror 6. The attachment portion 42 is provided with an opening 42A facing a reflective surface of the plane mirror 6. The opening 42A forms an optically effective opening, and the attachment portion 42 functions to mask an outer peripheral end portion of the plane mirror 6 around the opening 42A.

Further, the blind cover 4 is provided with a cutout portion 43 (FIG. 2, FIG. 3B, FIG. 4B, FIG. 4D, and FIG. 6) corresponding to a reflective surface of the concave mirror 7. The concave mirror 7 is attached such that the reflective surface closes an opening portion of the cutout portion 43 formed in the blind cover 4.

Further, the blind cover 4 is provided with a facing surface 45 that faces the cover glass 3 bonded to the upper case 2 and a guide surface 46A and a guide surface 46B formed on both sides (right and left sides in FIG. 4D) of the facing surface 45 and in contact with the upper case 2 (FIG. 4C, FIG. 4D).

As illustrated in FIG. 2, FIG. 4C, and FIG. 4D, a first light-shielding portion 51 is formed near the attachment portion 41 in the blind cover 4. The first light-shielding portion 51 blocks the display light deviating from the predetermined optical path P1 (FIG. 2) between the liquid crystal display 5 and the plane mirror 6. This may prevent the display light deviating from the predetermined optical path P1 from reaching the cover glass 3 via a different path and may improve the display quality of the head-up display. Further, the first light-shielding portion 51 is provided from the emission port of the upper case 2 to the upper end of the plane mirror 6 to provide a shield so as to make it difficult to directly view the plane mirror 6 and the liquid crystal display 5 from the emission port of the upper case 2. In other words, the first light-shielding portion 51 provides a shield so as to prevent sunlight (outside light) entering through the emission port of the upper case 2 from directly irradiating the plane mirror 6 and the liquid crystal display 5. This may prevent the outside light from reaching the cover glass 3 together with the display light through the predetermined optical path P1 after being reflected by the plane mirror 6 and the liquid crystal display 5 and may improve the display quality of the head-up display.

As illustrated in FIGS. 2, 4C, and 4D, a second light-shielding portion S2 is provided on the surface facing the cover glass 3 (emission port) in the blind cover 4. The second light-shielding portion S2 functions to prevent stray light so that the inside of the head-up display is not directly irradiated by the outside light entering through the cover glass 3 (emission port). Further, in actuality, the site that may function as the second light-shielding portion S2 includes not only the surface illustrated in the figure but also the entire range that is visible from outside through the cover glass 3 (emission port).

The upper case 2 is provided with a bonding surface 21 (FIG. 4E and FIG. 5A) to which the cover glass 3 is bonded. The cover glass 3 is fixed to the upper case 2 with its outer peripheral end portion bonded to the bonding surface 21 while forming a predetermined curved surface shape.

As illustrated in FIG. 4E, the facing surface 45 of the blind cover 4 faces the back surface (the lower surface in FIG. 4E) of the cover glass 3 in the outer peripheral end portion of the cover glass 3. A clearance is maintained between the facing surface 45 of the blind cover 4 and the back surface of the cover glass 3 to prevent the cover glass 3 from getting damaged due to the contact with the blind cover 4 during assembly and after assembly.

A mask portion 31 is provided on the back surface (the surface facing the inside of the head-up display) of the outer peripheral end portion in the cover glass 3. The mask portion 31 is, for example, a black print layer applied to the back surface of the cover glass 3 and is provided in the area including the site facing the boundary between the facing surface 45 and the bonding surface 21. The mask portion 31 has the effect of preventing stray light caused by external light from outside. Further, the facing surface 45 and the bonding surface 21, especially the boundary between the facing surface 45 and the bonding surface 21 is no longer visible, which improves the external appearance.

As illustrated in FIGS. 4C and 4D, the guide surface 46A and the guide surface 46B of the blind cover 4 are formed on both sides (right and left sides in FIG. 4D) of the blind cover 4 at positions farther away from the back surface of the cover glass 3 than the facing surface 45. When assembling the blind cover 4 and the upper case 2 to which the cover glass 3 is bonded, the guide surface 46A or the guide surface 46B is brought into contact with the upper case 2 so that the position of the upper case 2 is restricted. This prevents damages to the cover glass 3 due to the contact between the blind cover 4 and the cover glass 3. As illustrated in FIGS. 5B to 5D, the upper case 2 is provided with a guide surface 23A and a guide surface 23B that face the guide surface 46A and the guide surface 46B of the blind cover 4, respectively. The guide surface 46A, the guide surface 46B, the guide surface 23A, and the guide surface 23B all extend in the direction of an arrow 40 in FIG. 4C and FIG. 5B to FIG. 5D.

During assembly, the upper case 2 is slid in the direction of the arrow 40 while the guide surface 46A of the blind cover 4 is in contact with the guide surface 23A of the upper case 2 and the guide surface 46B of the blind cover 4 is in contact with the guide surface 23B of the upper case 2 so that the upper case 2 is easily guided to a predetermined assembly position. According to the present embodiment, the dimension of each unit is set such that the guide surface 46A and the guide surface 46B of the blind cover 4 are first brought into contact with the guide surface 23A and the guide surface 23B of the upper case 2 so that the facing surface 45, and the like, of the blind cover 4 is prevented from being in contact with the cover glass 3. This may prevent damages to the cover glass 3.

Furthermore, during assembly, the upper case 2 may be fixed and the blind cover 4 may be slid in the direction opposite to the arrow 40.

As illustrated in FIG. 2, according to the present embodiment, the upper case 2 is provided with a wall portion 25 that is shaped along the blind cover 4 in the vicinity of the surface forming the second light-shielding portion S2. For this reason, the blind cover 4 and the upper case 2 easily interfere with each other, and therefore the upper case 2 is slid relative to the blind cover 4 in a manner to insert the second light-shielding portion S2 between the cover glass 3 and the wall portion 25 thereby to assemble the blind cover 4 and the upper case 2. That is, the upper case 2 needs to be assembled by being slid relative to the blind cover 4 in the direction of the arrow 40. However, as the blind cover 4 includes the guide surface 46A and the guide surface 46B, smooth assembly is possible.

Furthermore, as illustrated in FIGS. 5B and 5C, the upper case 2 is provided with a guide portion 24A and a guide portion 24B, each formed as a pair of protrusions. The guide portion 24A and the guide portion 24B may engage with a wall portion 47A and a wall portion 47B, respectively, of the blind cover 4 during assembly. Specifically, the wall portion 47A and the wall portion 47B of the blind cover 4 are inserted into the gaps between the pair of protrusions of the guide portion 24A and the guide portion 24B so that the relative position of the upper case 2 relative to the blind cover 4 is restricted. In this state, the upper case 2 is slid in the direction of the arrow 40 so that the position of the upper case 2 (the position in the right and left direction in FIG. 4D and the position in the vertical direction in FIG. 5C) is restricted until the predetermined assembly position is reached and smooth assembly is possible. Furthermore, even in the final assembly position, the wall portion 47A and the wall portion 47B of the blind cover 4 may be inserted into the gaps between the pair of protrusions of the guide portion 24A and the guide portion 24B.

All of the guide surface 46A, the guide surface 46B, the guide surface 23A, the guide surface 23B, the guide portion 24A, and the guide portion 24B restrict the relative position between the upper case 2 and the blind cover 4 with respect to the direction perpendicular to the sliding direction described above.

Furthermore, according to the present embodiment, the first light-shielding portion 51 is provided in the blind cover 4 instead of the upper case 2. Therefore, before assembling the upper case 2 and the blind cover 4, the state of the first light-shielding portion 51 may be visually checked in an easy manner, and dust and the like adhering to the first light-shielding portion 51 may be easily removed. In particular, in the configuration where a low-reflective sheet including a foam resin layer is attached to the first light-shielding portion 51, the foam resin layer has a high dust adsorption property and there is a high possibility of dust contamination during assembly, and therefore it is effective to have the configuration where the blind cover 4 includes the first light-shielding portion 51.

As illustrated in FIG. 6, a rotary shaft 71 attached to the concave mirror 7 is supported at both end portions by an attachment portion 73 and the attachment mechanism 80 so that the concave mirror 7 is attached to the blind cover 4. The concave mirror 7 is rotatable around the rotary shaft 71, and the angle of the concave mirror 7 is adjustable by a motor (not illustrated).

As illustrated in FIG. 7, the attachment mechanism 80 includes a bearing portion 81 supporting one end portion of the rotary shaft 71, a plate spring 82 supported with one end portion 82a fixed to the bearing portion 81 and the other end portion in contact with a support portion 81a of the bearing portion 81, and a contact portion 48 (stopper portion) formed as part of the blind cover 4 and located near the rotary shaft 71. The bearing portion 81 includes two contact surfaces that are separated in a V-shape, and the rotary shaft 71 is supported by these surfaces. The plate spring 82 is provided to face the contact surfaces of the bearing portion 81 with the rotary shaft 71 interposed therebetween. The rotary shaft 71 supported by the bearing portion 81 is also in contact with the plate spring 82 and is pressed against the two contact surfaces of the bearing portion 81 due to the elastic force of the plate spring 82. Thus, the rotary shaft 71 is supported from three directions.

When the head-up display is subjected to a strong impact, the rotary shaft 71 jumps off the bearing portion 81 and pushes the plate spring 82. At this time, the plate spring 82 is unable to withstand the load of the collision and is plastically deformed. However, by providing the contact portion 48, which is a mechanical stopper, in the range of elastic deformation of the plate spring 82, the plate spring 82 is brought into contact with the contact portion 48 and the deformation of the plate spring 82 is suppressed. Thus, it is possible to prevent the loss of the function of the concave mirror 7, i.e., the function of the head-up display due to the rotary shaft 71 being removed from the bearing portion 81. Furthermore, as the contact portion 48 is formed as part of the blind cover 4, there are no external appearance issues. For example, when the contact portion 48 (stopper portion) is formed in the upper case 2, there is a need to form a tall rib shape, and drafts are likely to cause sink marks at the base of the rib and result in poor external appearance. According to the present embodiment, the contact portion 48 is provided in the blind cover 4, which eliminates the need for a tall rib shape and does not cause external appearance issues.

As described above, according to the present embodiment, at least two light-shielding portions are provided in the blind cover 4. However, according to the present embodiment, the first light-shielding portion 51 and the second light-shielding portion S2 are provided in the blind cover 4, and therefore processing such as black printing (painting), surface texturing, or attachment of a low-reflective sheet may be done in a single step. Furthermore, a reduction in the number of members may achieve a reduction in the burden of an assembling work.

Furthermore, the attachment portion 42 for attaching the plane mirror 6 is formed in the blind cover 4, and the blind cover 4 supports the plane mirror 6. Therefore, as the attachment portion 42 is located between the first light-shielding portion 51 and the second light-shielding portion S2, the attachment portion 42 may be effectively used as the portion coupling the first light-shielding portion 51 and the second light-shielding portion S2. In particular, as the attachment portion 42 and the second light-shielding portion S2 are close to each other, the blind cover 4 is not required to have a complex shape in order to couple the attachment portion 42 and the second light-shielding portion S2. For example, as in the present embodiment, the attachment portion 42 and the second light-shielding portion S2 may be configured as a continuous shape.

Although each of the above embodiments has been described in detail, there are no limitations on the specific embodiments, and various modifications and changes are possible within the range set forth in the scope of claims Furthermore, all or some of the components in the embodiments described above may be combined.

According to the above embodiment, the first mirror is configured as a plane mirror, and the second mirror is configured as a concave mirror; however, this is not a limitation. For example, both the first mirror and the second mirror may be configured as concave mirrors.

DESCRIPTION OF REFERENCE NUMERALS

2 Upper case
3 Cover glass
4 Blind cover
5 Liquid crystal display
6 Plane mirror
7 Concave mirror
23A, 23B Guide surface
24A, 24B Guide portion
25 Wall portion
31 Mask portion
42 Attachment portion
46A, 46B Guide surface
48 Contact portion
80 Attachment mechanism
81 Bearing portion
82 Plate spring
S1 First light-shielding portion
S2 Second light-shielding portion

The invention claimed is:

1. A head-up display comprising:
a display device that displays an image;
a first mirror that reflects display light from the display device;
a second mirror that reflects the display light having passed the first mirror;
a cover glass that transmits the display light having passed the second mirror;
a case that houses the first and second mirrors; and
a blind cover formed as an integral member, the blind cover being separate from the case and disposed within the case, wherein
the head-up display presents a virtual image with the display light projected onto an object through a predetermined optical path from the display device to the first mirror, the second mirror, and the cover glass, and
the blind cover includes
a first light-shielding portion that shields the display light deviating from the predetermined optical path between the display device and the first mirror,
a second light-shielding portion that prevents outside light having passed through the cover glass from entering inside, and
an attachment portion that attaches the first mirror to the blind cover.

2. The head-up display according to claim 1, wherein
the case comprises an upper case to which the cover glass is attached,
the blind cover includes a guide surface that is brought in contact with the upper case and guides a relative position of the upper case relative to the blind cover during assembly of the blind cover and the upper case, and
during the assembly, the guide surface is in contact with the upper case so that the blind cover is prevented from being in contact with the cover glass.

3. The head-up display according to claim 2, wherein
the upper case is provided with a wall portion that is shaped along the second light-shielding portion in vicinity of the second light-shielding portion, and
the upper case is slid relative to the blind cover in a manner to insert the second light-shielding portion between the cover glass and the wall portion thereby to assemble the blind cover and the upper case.

4. The head-up display according to claim 2, wherein the upper case includes a guide portion that restricts a relative position between the blind cover and the upper case when the blind cover and the upper case are assembled.

5. The head-up display according to claim 2, wherein the cover glass is provided with a mask portion that hides a boundary between the upper case and the second light-shielding portion.

6. A head-up display comprising:
a display device that displays an image;
a first mirror that reflects display light from the display device;
a second mirror that reflects the display light having passed the first mirror;
a cover glass that transmits the display light having passed the second mirror;
a blind cover formed as an integral member; and
an attachment mechanism to attach the second mirror to the blind cover,
wherein the head-up display presents a virtual image with the display light projected onto an object through a predetermined optical path from the display device to the first mirror, the second mirror, and the cover glass,
wherein the blind cover includes:
a first light-shielding portion that shields the display light deviating from the predetermined optical path between the display device and the first mirror;

a second light-shielding portion that prevents outside light having passed through the cover glass from entering inside; and an attachment portion that attaches the first mirror to the blind cover, and wherein the attachment mechanism includes:

a bearing portion supporting a rotary shaft that rotatably supports the second mirror;

a plate spring provided to face the bearing portion with the rotary shaft interposed therebetween and is in contact with the rotary shaft; and a stopper portion that limits deformation of the plate spring.

7. The head-up display according to claim 6, wherein the stopper portion is formed as part of the blind cover.

* * * * *